United States Patent [19]
Anderson et al.

[11] Patent Number: 5,861,751
[45] Date of Patent: *Jan. 19, 1999

[54] ELECTRICAL GEOPHYSICAL METHODS AND APPARATUS FOR DETERMINING THE IN-SITU DENSITY OF POROUS MATERIAL

[76] Inventors: Dennis M. Anderson, P.O. Box 140; William J. Ehni, P.O. Box 4220, both of Carson City, Nev. 89702

[21] Appl. No.: 851,969

[22] Filed: May 6, 1997

Related U.S. Application Data

[60] Provisional application No. 60/017,277, May 13, 1996.

[51] Int. Cl.$^6$ ...................................................... G01V 3/06

[52] U.S. Cl. ........................... 324/347; 324/717; 324/323; 73/152.06

[58] Field of Search ..................... 73/38, 152.05, 73/152.06, 152.07; 324/715, 717, 718, 375, 376, 347

[56] References Cited

U.S. PATENT DOCUMENTS

| | | | |
|---|---|---|---|
| 3,982,177 | 9/1976 | Walker | 324/376 |
| 4,166,244 | 8/1979 | Woods | 324/715 |
| 4,907,448 | 3/1990 | Givens | 73/38 |
| 5,105,154 | 4/1992 | Givens | 324/376 |
| 5,209,104 | 5/1993 | Collins | 73/38 |

OTHER PUBLICATIONS

1942 AIME vol. 146, Petroleum Development and Technology G.E. Archie, pp. 54–61.

1986 Parasnis, D.S., Principles of Applied Geophysics, Fourth Ed. Chapman & Hall, NY NY, pp. 119–125, Equation #4.25–p. 122.

1966 Handbook of Physical Constants, Clark, Sec 26, Keller, G.V. Elec. Properties of Rocks, pp. 553–577, Equation #1 p. 555.

1932 Schlumberger, M. and C., Tech. Pub. No. 462, AIME, pp. 1–38.

1929 Schlumberger, M. and C., Tech. Pub. No. 315, AIME, pp. 1–16.

1950 Wyllie & Rose, Petroleum Transactions, AIME, vol. 189, 1950 pp. 105–118.

*Primary Examiner*—Josie Ballato
*Assistant Examiner*—Jose M. Solis

[57] ABSTRACT

The invention includes a method and device for determining the in-situ density of a porous material. A resistivity measuring device applies an electrical current through an electrode array to measure the resistivity of the porous material. The resistivity measuring device may also be used to measure the resistivity of a pore filling fluid. A formation factor and in-situ density constants of the porous material are determined using empirical methods. In-situ moisture content of the porous material is determined. The above data is applied to a general geophysical in-situ density equation to calculate the in-situ density of the porous material.

12 Claims, 3 Drawing Sheets

ELECTRICAL GEOPHYSICAL METHODS AND APPARATUS FOR DETERMINING THE IN-SITU DENSITY OF POROUS MATERIAL

CROSS REFERENCES TO RELATED APPLICATIONS

This application claims priority of U.S. patent application Ser. No. 60/017,277 filed on May 13, 1996.

BACKGROUND OF THE INVENTION

1. Field of Invention

This invention relates to electrical geophysical methods and apparatus for determining the in-situ density of homogeneous porous materials.

2. Description of Related Art

In-situ density calculations using electrical geophysics were developed by Anderson and Ehni in 1996, using resistivity measurements and porosity calculations as developed by G. E. Archie, combined with a formation factor or constant. These formation and/or solution factors are empirically derived through experimentation and testing for repeatability.

The invention involves a process and apparatus requiring specific measurements using equipment consisting of a resistivity meter and a series of electrodes (in groups of four) set up in an array which directly measures the electrical resistivity of a homogenous porous medium, such as compacted fill for the roadbase of a highway or foundations for building construction. The testing process is non-destructive, fast, and can be conducted during and/or after the material has been installed. Electrical resistivity data are collected in the field and are used to calculate the in-situ density of the construction site at the time of field investigation. The test methodology includes a set of standard operational techniques for acquiring the electrical resistivity data which is used to quantify the porosity of the earthen material and qualitatively calculate the in-situ density the earthen material.

Development of an electrical geophysical method and apparatus for determining the in-situ density of porous materials at the earths surface utilizes two primary principles of applied geophysics. Both of the geophysical principals had their origin in the petroleum industry and were not considered, assessed, examined, or adapted for use for geotechnical engineering until Anderson and Ehni recognized their potential, conducted research to assess adaption of the principals, and developed the invention that is presented herein.

The first geophysical principal is based on work by Conrad and Marcel Schlumberger (1930) who developed a system of measuring the resistivity of surface rocks with electrodes deployed on the surface. They used the subsurface zone variations in resistivity to interpret gross geologic structural phenomena. They later applied this technology to evaluating the lithology of well bores that were drilled for petroleum exploration.

The second geophysical principal uses G. E. Archie's 1941 work. Archie presented his work in 1942 in a paper entitled *The Electrical Resistivity Log as an Aid in Determining Some Reservoir Characteristics*. Archie determined porosities of various materials using resistivity measurements. Mathematical formulas that G. E. Archie derived, and other relevant mathematical formulas that have been adapted for use in the invention.

By adapting these two petroleum exploration and production industries principles for use with modified geotechnical engineering equations for earthen material density, a new, accurate method has been developed for determining the in-situ density of porous materials at the near surface.

The following prior art reflects the state of art of which the applicant is aware and is included herewith to discharge applicant's duty to disclose relevant prior art. However, that none of these references teach singly nor render obvious when considered in any conceivable combination the nexus of the instant invention as disclosed in greater detail hereinafter and as particularly claimed.

Anderson, D. M. and Ehni, W. J., Geophysical Methods and Apparatus for Determining the Hydraulic Conductivity of Porous Materials, U.S. patent application Ser. No. 08/370,102 filed on Jan. 9, 1995. Continuation In Part, filed Apr. 15, 1997 by Patent Agent, Ian Burns, Esq., Attorney Docket No. :1273.01

Archie, G. E., The Electrical Resistivity Log as an Aid in Determining Some Reservoir Characteristics, Transaction of the American Institute of Mining and Metallurgical Engineers, Vol. 146, 1942

American Society for Testing and Materials (ASTM), ASTM D 1557–78 or 698–78 Standard Test Methods for Moisture-Density Relations of Soil and Soil Aggregate Mixtures, 1988 Annual Book of ASTM Standards, 4 Construction, Philadelphia, Pa., 1988

Bowles, J. E., Engineering Properties of Soils and Their Properties, McGraw-Hill, New York, 1992

Cernica, John N., Geotechnical Engineering: Soil Mechanics, Wiley, N.Y., 1995

Hunt, Roy E., Geotechnical Engineering Investigation Manual, McGraw-Hill Book Company, New York, 1984

Parasnis, D. S., Principles of Applied Geophysics, Fourth Edition, Chapman & Hall, New York, N.Y., 1986

Schlumberger C., and Schlumberger M.; Depth of investigation attainable by potential methods of electrical exploration . . . ; AIME Technical Publication No. 315; 1930

Schlumberger C., Schlumberger M., Leonardon E. D.; Electrical Coriing: a Method of Determining Bottomhole data by Electrical Measurements.; Transactions of the AIME; Technical Publication No. 462; 1932

Wyllie, M. R. J. and Rose, Walter D., Some theoretical Considerations Related to the Quantitative Evaluation of the Physical characteristics of Reservoir Rock from Electrical Log Data, Gulf Research and Development Co., AIME Petroleum Branch, 1949

Related patent applications

U.S. patent application Ser. No. 08/370,102 with filing date Jan. 9, 1995, and Continuation In Part, filed Apr. 15, 1997 by Patent Agent, Ian F. Burns, Esq., Attorney Docket No. :1273.01; and Patent Cooperation Treaty Application No. PCT/US96/00355 with international filing date 11 JAN 96 are related to this patent application. The title of the above mentioned applications is: Geophysical Methods and Apparatus for Determining the Hydraulic Conductivity of Porous Materials. D. M. Anderson and W. J. Ehni are co-inventors and co-applicants for the above mentioned patent applications. The apparatus and method of acquiring the electrical resistivity field data for determining relative in-situ density of porous material uses portions of the prior art. However, in the invention disclosed herein the data digest and integration of different mathematical equations and expressions produces a relative density result from the measured resistivity data.

Provisional Patent Application with Ser. No. 60/017,660 filed with the US Patent and Trademarks Office on May 14, 1996, titled Electrical Geophysical Methods and Apparatus for Determining the Percent (%) Moisture of Porous Materials was filed by D. M. Anderson and W. J. Ehni.

SUMMARY OF INVENTION

1. Objects of the Invention

The objective of the invention is to provide on-site/ immediate in-situ density data for construction material that may be used for construction Quality Control and Quality Assurance (QC/QA), as well as field documentation for submittal to a regulating authority.

Federal, state, and/or local government regulations require a QC/QA program be implemented during the construction phase of building projects that involve compacted fill earthen material. The QC/QA program involves on-site technical or engineering staff that monitor construction activities and prepare certified engineering reports as to the quality of the facility construction compared to the facility design.

In highway construction the in-situ density design specifications are typically dictated by engineering requirements or state/federal regulations. An example of a regulation that calls for a prescriptive compacted fill specification is the Nevada Department of Transportation, Standard Specifications for Road and Bridge Construction, Section 305 Roadbed Modification Subpart 305.03.05. These regulations contain a minimum design criteria for the construction of a highway roadbed. The regulation states:

"After the materials have been satisfactory mixed, the mixture shall be bladed and compacted to a ninety-five (95) percent relative maximum density as determined by Test Method No. Nev. T101. Test Method No. Nev. T102 or T103 may be used to determine the in-place density. Test method to be determined by the Engineer."

The existing technologies include physical measuring techniques and nuclear density gauges. The primary advantage of the invention disclosed herein is that the apparatus and methodology do not use a nuclear source to provide fast, accurate in-situ density measurements. The invention uses electrical resistivity as the basis for measuring and calculating in-situ density.

2. Brief Description of the Invention

Front-end geotechnical analysis is an industry standard practice for construction projects that use earthen materials. The invention uses a general geophysical-in-situ density equation (Anderson & Ehni 1996) that requires a set of empirically derived constants. The empirically derived constants that are used in the calculations for determining the in-situ density of the earthen construction materials are established for each soil type product that is scheduled for use in the construction. For each homogenous porous material a set of constants are established for use in the general geophysical-in-situ density equation.

The empirically derived constants are established by conducting pre-construction geotechnical tests. A series lab tests or side-by-side tests are performed to establish the soil characteristics constants within an acceptable confidence level for repeatability for actual construction use with a given porous material that is considered geotechnically homogeneous. Once the constants are established, only two general geophysical-in-situ density equation variables, R and S, are field measured at each test site during the construction phase of the project.

The process involves measuring the resistivity of the unsaturated dry porous medium, measuring the resistivity of the pore filling fluid; empirically deriving a formation factor constant and an in-situ density constant based on the physical properties of the pore filling fluid and the porous medium; and then measuring the resistivity of the saturated, or partially saturated, porous medium. The in-situ density of the material is directly related to its porosity and by measuring the in-situ porosity of the porous medium, the in-situ density can be calculated using a general geophysical-in-situ density equation (Anderson & Ehni, 1996)

BRIEF DESCRIPTION OF THE DRAWINGS

The Drawings are represented by, FIGS. 1-A, 1-B, 2-A and 2-B; and 3-A and 3-B.

In the drawings, closely related figures have the same number but different alphabetic suffixes. Drawing #1 includes FIG. 1-A and FIG. 1-B, Drawing #2 includes FIG. 2-A and FIG. 2-B, and Drawing #3 includes FIG. 3-A and 3-B.

FIG. 1-A shows an electrode array that is used to make measurements of resistivity of a porous soil medium.

FIG. 1-B shows a section view of the test along the first line that is energized and tested.

FIG. 2-A shows a plan view of the electrical/mechanical Electrode Positioning Device.

FIG. 2-B shows a side view of the electrical/mechanical Electrode Positioning Device.

FIG. 3-A shows a plan view of an optional deployment of electrodes in a 16 electrode array. This array allows for the assessment of a larger volume of porous material.

FIG. 3-B show a section view of the optional 16 electrode array configuration.

DESCRIPTION OF THE PREFERRED EMBODIMENT

The invention involves a process and apparatus requiring specific measurements using equipment consisting of a resistivity meter and a series of electrodes (in groups of four) set up in an array which directly measures the electrical resistivity of a porous medium, such as road base for highway construction and/or compacted earthen materials that serve as foundations for buildings.

Electrical resistivity data are collected in the field and are used to calculate the in-situ in-situ density of the earthen materials at the time of field investigation. The test methodology includes a set of standard operational techniques for acquiring the electrical resistivity data which is used to quantify the porosity of the earthen material and qualitatively calculate the in-situ density of the in-situ earthen material.

Portable methods of assessing the change in in-situ density over time, require a portable system which is returned to the same location for measurements over a period of time. Both methods produce data at discrete time intervals providing data on the variation in in-situ density over any desired time interval.

Front-end geotechnical analysis is an industry standard practice for construction projects that use earthen materials. The invention uses a general geophysical-in-situ density equation (Anderson & Ehni 1996) that requires a set of empirically derived constants. The empirically derived constants that are used in the calculations for determining the in-situ density of the constructed roadbase or earthen foundation materials are established for each soil type product that is scheduled for use in the construction. For each homogenous porous material a set of constants are established for use in the general geophysical-in-situ density equation.

The empirically derived constants "n", "a", "m", and "$C_v$ or $C_\rho$" are established by conducting pre-construction geotechnical tests. The pre-construction tests involve contemporary geotechnical laboratory density analysis or field density analysis in side-by-side testing with the invention. A series of laboratory or field side-by-side tests are performed to establish an acceptable confidence level for repeatability for actual construction use with a given porous material that is considered geotechnically homogeneous. The general geophysical-in-situ density equation variables "n", "a", "m", and "$C_v$ or $C_\rho$" are adjusted to yield the same number, or the best fit number, as the contemporary geotechnical techniques when calculating in-situ density of the earthen materials. Then the variables "n", "a", "m", and "$C_v$ or $C_\rho$" are set as constants for the given homogenous porous material. Once the constants are established, only two general geophysical-in-situ density equation variables, "R" and "S", are field measured at each test site during the construction phase of the project.

Reference Numerals in the Drawings are as follows:

1 Electrical Resistivity Meter, with a precision and sensitivity that is capable of measuring very discrete differences in the electrical properties of the porous material, this item is denoted by an "R" within a circle
2 Current Electrode
3 Potential Electrode
4 Potential Electrode
5 Current Electrode
6 Surface expression of the area that overlays the portion of the ellipsoid that is assessed during testing
7 Volume of the one half of the ellipsoid that is assessed during testing, the ellipsoid semi-axes are related to the "a" spacing that is used in the positioning device. The semi-axes are equal to 1.0 a, 1.5a, and 0.5a and the total gross estimated volume to the porous material assessed is equal to V=0.28 $\pi$ $a^3$. Where "a" is equal to the electrode separation, i.e. the distance between numeral references 2 and 3.
8 Depth of investigation, which is also equal to the electrode separation, i.e. the distance between numeral references 2 and 3.
9 Line of Equal Potential that represents electrical current flow into the porous soil medium from the Current Electrode, i.e. numeral reference 5, which is emitting an electrical field
10 Line of Equal Potential that represents electrical current flow into the porous soil from the Current Electrode, i.e. numeral reference 2, which is emitting an electrical field
11 Pivot Point, the center of the Rigid Electrical Insulator with a pointed projection that is used to reposition the electrodes during a testing procedure
12 Distance between the electrodes, typically the separations are equal
13 Electrode Positioning Device, which is made of a rigid electrical insulating material
14 Position of line two for energizing and sensing
15 Position of line three for energizing and sensing
16 Position of line four for energizing and sensing
17 Spherical Cap of Investigation; the Volume "V" is represented by the following equation; V=⅓ $\pi a^2$ {3(1.625 a)−a}; Where "a" is equal to the electrode separation, i.e. the distance between numeral references 2 and 3.

In all the figures, the volume of the porous material that is tested represents a gross estimate that is depicted with simple geometry. The geometry depicts the minimum volumes, and the actual volumes of porous material that is tested is larger.

Figure 1:
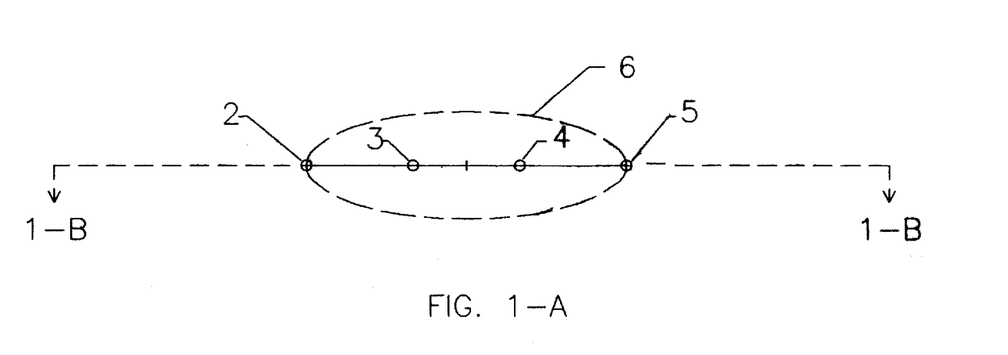

In FIG. 1-A and FIG. 1-B, the volume of material investigated is related to the electrode array employed. For an electrode array with an "a" Spacing of one foot, the volume of material evaluated is approximately 0.88 cubic feet (e.g. V=0.28125 $\pi$ $1^3$. The two Current Electrodes (numeral references 2 and 5) are positioned on the outside of the array and the two Potential Electrodes (numeral references 3 and 4) are positioned inside the array. In FIG. 1-A and FIG. 1-B the electrodes are separated by an equal distance, which is known as the "a" Spacing. The "a" Spacing also represents the depth of investigation, FIG. 1-B numeral reference 8.

Figure 2:
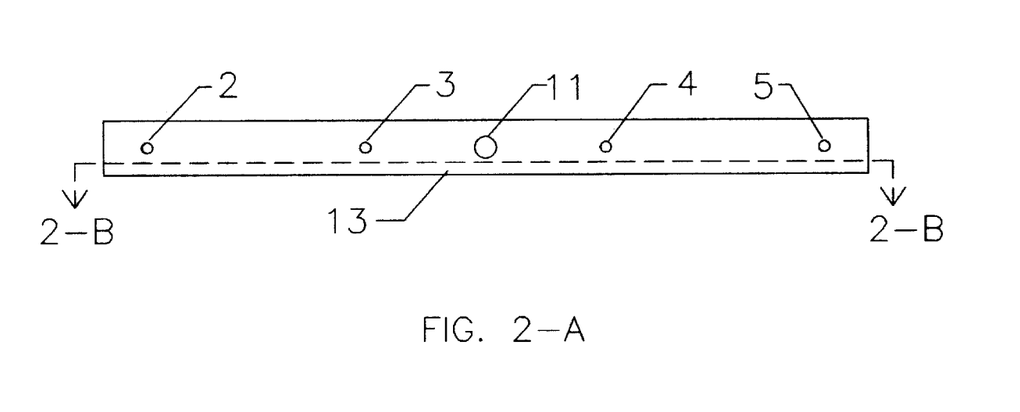

The electrode apparatus is comprised of an Electrode Positioning Device and at least four electrodes which are connected to a resistivity meter. The Electrode Positioning Device (FIG. 2-A and FIG. 2-B; numeral reference 13) has numerous electrode receptacles, and is used for positioning the electrode sets at various locations in order to be able to select a variety of electrode arrays and maintain the same electrode spacing.

The Electrode Positioning Device is surface mounted on the porous soil medium (ground) that is being tested. The electrodes are all required to be in good contact with the surface of the material that is being tested. Surface mounting enables testing without damage to the soil that is being tested. The electrode positioning device is portable and has a pivoting mechanism (FIG. 2-A and FIG. 2-B numeral reference 11) in the center of it which maintains the electrode array in a central position allowing the electrode array to be rotated about it for testing a larger volume than when used without rotating the positioning device.

Figure 3:
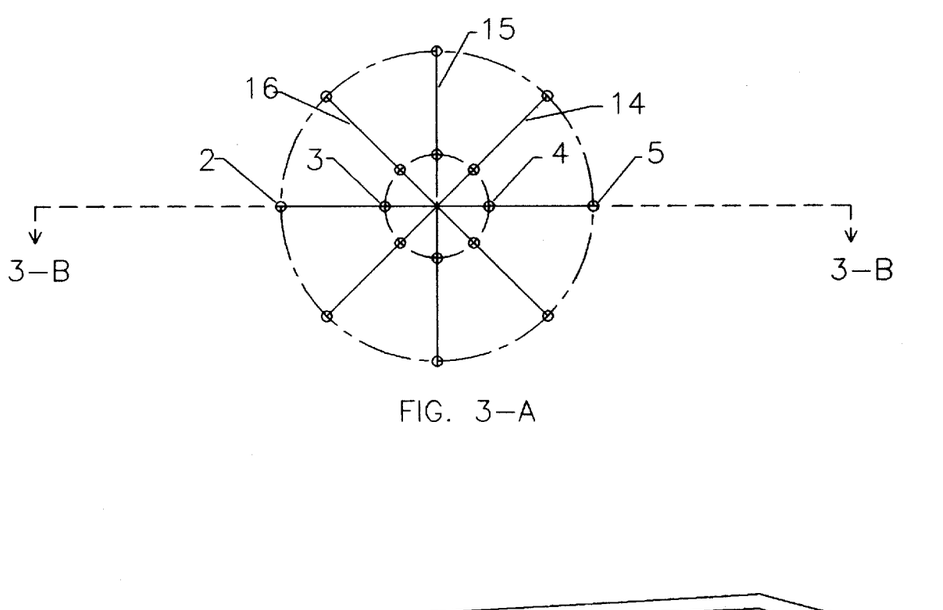

In FIG. 3-A the four lines are each energized and tested separately. The first line that is tested is represented by the numeral references 2, 3, 4, and 5. The other three lines are represented by the numeral references 6, 7, and 8, these lines represent three 45° rotations around the center of the electrode array. The measured in-situ density for the sixteen electrode array assesses the volume of a spherical cap with a height equal to the array's "a" Spacing. The radius of the sphere cap is 1.625 times the "a" spacing.

Geophysical formulas are employed with the invention for calculating the in-situ density of porous mediums. The formulas are listed in the sequence that they are used in the following section:

The invention initially uses existing geotechnical laboratory and/or field testing technologies to measure in-situ density at the surface for a side-by-side comparison with the invention. The comparison provides data to empirically establish the following equation factors:

n=Variable, usually very close to 2.0, for water saturation over 30% and increases to for water saturation less than 1%.

a=Formation factor typically varying between 0.47 and 2.00; unitless.

m=Cementation exponent which usually varies from 1.3 to 2.0.

$C_v$ or $C_\rho$=Empirically derived unitless constant that is related to the density of the solution.

The empirically derived factors and constants are established through laboratory testing of the compacted material or by side-by-side testing with contemporary technology (i.e. ASTM, 1973, Relative Density of Cohesionless Soil or ASTM D 1557-78 or 698-78 Standard Test Methods for Moisture-Density Relations of Soil and Soil Aggregate Mixtures, or ASTM D 2922-81 Standard Tests for Density of Soil and Soil Aggregates in Place by Nuclear Methods (Shallow Depths)). The ASTM D 1557-78 or 698-78 procedure involves four or more tests on a given soil type to determine the maximum density of the soil product which will occur at the optimum moisture. The test data is presented in table form and as a graph that shows the moisture content as it relates to the compacted density. When the material is tested with the moisture content being below or above the optimum for the soil product the density observed in the test is less than the maximum density. The laboratory tests to establish the formation factor, and the other empirically derived constants for a given soil product (e.g. "n", "a", "m", and "$C_v$ or $C_p$") involves measuring the resistivity of the compacted earthen material using a small four electrode array that is either installed in the bottom, or side, of a non-conductive standard compaction mold, or by placing a small electrode array assembly on the top of the compacted sample that is in the non-conductive standard compaction mold. The resistivity of the sample earthen material is measuring the using the four electrode array during each of the four tests that are performed as prescribed in ASTM D 1557-78 or 698-78. The laboratory or field tests are conducted on the material from the material source that will be used in the construction of the roadbase or the building foundation. The factors are used as formation standards for the soil type that is being tested with the invention during the construction QC/QA monitoring program.

Once "n", "a", "m", and "$C_v$ or $C_p$" are established for a given porous material type, then these constants are used routinely for subsequent in-situ density testing of the porous material type.

The irreducible water saturation "$Sw_{irr}$" is either determined by lab testing or is set at a whole number between 1 and 10. The "$Sw_{irr}$" is the percent irreducible water saturation (the number is typically represented in percentage form. i.e., Y %)

The percent soil moisture content "S" is field measured independently using standard geotechnical techniques and is included in the calculations as described below.

The resistivity of the permeant "$R_w$" is either measured in the field or in the lab prior to field investigation. "$R_w$" is equal to the resistivity of permeant (water plus dissolved salts or chemical constituents) in Ohm-meters as derived through physical measurements and calculations using equation 1 below. The test procedure includes mixing one part soil product with five parts water in a vessel that has a four electrode array installed in the bottom, then allowing the mixture to stabilize and the colloidal particles to settle, such that two consecutive resistivity measurements deviate by less than 2%. Then measuring the resistivity of the solution by using the four electrode array with the set "a" spacing and then calculating the resistivity of the permeant in Ohm-meters.

Geophysical formulas are employed with the invention for calculating the in-situ density of porous mediums. The following section lists the formulas in the sequence that they are used.

The invention determines the in-situ density porous material by:
  1. Measuring the resistivity of the porous medium and the pore filling fluid. The resistivity measurements are obtained by expanding on a technique first described by Schlumberger. The process is not dependent on the type of electrode array used; however, the most convenient one is the Wenner electrode array (Parasnis 1986). The depth of investigation for the Wenner Array is equal to the "a" spacing.
  2. Calculating the porosity of the porous medium by expanding on the theories initially developed G. E. Archie, 1942 (Keller 1966).
  3. Calculating the in-situ density using the relationship of porosity to in-situ density using a geophysical in-situ density equations (Anderson & Ehni, 1996).

Using the work of Wenner, Archie and one of two sets of mathematics developed by Anderson-Ehni this process can be summarized as follows:
  1. Measurement of the bulk resistivity (porous medium and the pore filling fluid, i.e. permeant): Wenner Array, apparent resistivity (Parasnis, D. S., 1986):

$$\sigma_a = 2\pi A_m \left( \frac{\Delta V}{I} \right) \quad \text{(equation 1)}$$

Where:
  $\sigma_a$=Apparent Resistivity of the medium in Ohm-meters
  $A_m$=Spacing distance of electrodes in meters, "a" spacing
  $\Delta V$=Volts
  I=Current (amps)
  2. Calculate the porosity of the medium by rearranging Archie's equations, which relate total resistivity (R) to a product of the resistivity of the permeant (Rw), the porosity ($\phi$), the percentage of pore space saturation (S), and the resistivity of the formation (a): Archie, 1942, general form equation (Keller 1966):

$$R = a R_w \Phi^{-m} S^{-n} \quad \text{(equation 2)}$$

Where:
  Anderson and Ehni (1993) rearranged Archie 1942 equation to solve for $\phi$ as shown in equation 3;

$$\rightarrow \Phi = \sqrt[m]{\frac{aR_W}{RS^n}} \quad \text{(equation 3)}$$

and,
  $\phi$=Porosity in a decimal form.
  $R_w$=Resistivity of permeant (water plus dissolved salts or chemical constituents) in Ohm-meters.
  R=Observed resistivity (e.g. porous material) in Ohm-meters
  S=Percent of the pore volume filled with permeant, (the number is typically represented in percentage form. i.e., X %)
  n=Variable, usually very close to 2.0, for water saturation over 30% and increases to 10 for water saturation less than 1%.
  a=Formation factor typically varying between 0.47 and 2.00; unitless.
  m=Cementation exponent which usually varies from 1.3 to 2.0.
  3. VOID RATIO DENSITY: Calculate the in-situ density by utilizing the relationship of porosity and in-situ density using conventional volume/density equations that were adapted for the new process. The following sequence of equations are used to derive the relative in-situ density of porous material using the relationships of void ratios (Bowles, J. E. 1992).

$$D_r = \left( \frac{e_{max} - e}{e_{max} - e_{min}} \right) \quad \text{(equation 4)}$$

Where:
$D_r$=Relative Density of in-situ porous material
$e_{max}$=void ratio of the soil in loosest state; also defined as $V_v/V_s$ which represents the volume of voids divided into the volume of solids in a unit sample
$e_{min}$=void ratio of the soil in densest state; also defined as $V_v/V_s$ which represents the volume of voids divided into the volume of solids in a unit sample
$V_v$=volume of voids in a unit sample
$V_s$=volume of solid material in a unit sample
e=void ratio for in-situ state, i.e. $V_v/V_s$
and, the porosity is related to the void ratio (Hunt, Roy E., 1984):

$$\Phi = \frac{V_v}{V_t} = \frac{e}{1+e} \quad \text{(equation 5)}$$

Where:
Anderson and Ehni (1996) rearranged the equation to solve for "e" as shown in equation 6:

$$\rightarrow e = \frac{\Phi}{1-\Phi} \quad \text{(equation 6)}$$

and,
$V_v$=volume of voids in a unit sample
$V_t$=total volume of a unit sample
$\phi$=porosity in a decimal form, as determined by using equations 1 and 2

Therefore:
The general form of the geophysical-in-situ density equation is derived by combining equations 1, 3, 4, and 6 into a single equation (e.g. equation 7) that yields a in-situ density. The geophysical in-situ density equation using void ratios is as follows; Anderson & Ehni, 1996, geophysical in-situ density, synthesis No. 1:

$$D_r = \left( \frac{e_{max} - \frac{\Phi}{1-\Phi}}{e_{max} - e_{min}} \right) \times C_V \quad \text{(equation 7)}$$

$C_v$=Empirically derived unitless constant that is related to the $e_{max}$ and $e_{min}$ for a given soil product type.

RELATIVE DENSITY: A second set of mathematics can also be used in replacement of the Anderson & Ehni, 1996 geophysical in-situ density, synthesis No. 1. The in-situ relative density may be derived using mathematics that relate the porosity to the soil density. Equations 1 and 2 are employed as above. However void ratios are difficult to obtain (they require specificity gravity $G_s$ of the soil), therefore the equation generally used in geotechnical engineering to derive relative density, $D_r$, is listed below, along with geophysical adaptations (Bowles, J. E. 1992):

$$D_r = \left( \frac{\rho_f - \rho_{min}}{\rho_{max} - \rho_{min}} \right) \left( \frac{\rho_{max}}{\rho_f} \right) \quad \text{(equation 8)}$$

Where:
$\rho_{max}$=maximum laboratory density (or unit weight)
$\rho_{min}$=minimum laboratory density (or unit weight)
$\rho_f$=field or in-situ density (or unit weight)
and, the porosity is related to the field density and the specific gravity (Hunt, Roy E., 1984):

$$\Phi = 1 - \frac{\rho_f}{G_s} \quad \text{(equation 9)}$$

Where:
Anderson and Ehni (1996) rearranged the equation to solve for "$\rho_f$" as shown in equation 10:

$$\rightarrow \rho_f = (1-\phi)G_s \quad \text{(equation 10)}$$

and
$\phi$=porosity, as determined by using equations 1 and 2
$G_s$=Specific gravity, which equals the weight of the solids divided into the volume of the solids times the unit weight of water: $W_s/V_{s\gamma w}$ Therefore:
The general form of the geophysical-in-situ density equation is derived by combining equations 1, 3, 8, and 10 into a single equation (e.g. equation 11) that yields a in-situ density number. The geophysical-in-situ density equation using soil density is as follows; Anderson & Ehni, 1996, geophysical in-situ density, synthesis No. 2.

$$D_r = \left( \frac{(1-\Phi)G_s - \rho_{min}}{\rho_{max} - \rho_{min}} \right) \left( \frac{\rho_{max}}{(1-\Phi)G_s} \right) \times C_\rho \quad \text{(equation 11)}$$

$C_\rho$=Empirically derived unitless constant that is related to the $\rho_{max}$ and $\rho_{min}$ for a given soil product type.

The in-situ density of the subject test is then calculated using a geophysical-in-situ density equation, Anderson & Ehni, 1996 synthesis, as identified above as equation 5 or 8.

Thus it will be understood that the present invention provides a novel approach to determining the in-situ density of a porous material. By utilizing a general geophysical in-situ density equation (equation 5 or 8) a user may conveniently and inexpensively determine the in-situ density using the resistivity of the porous material. Once a number of variables and constants have been determined for a given porous material, the in-situ density may be efficiently calculated many times. This is a significant advance over the prior art methods which require large amounts of time and effort to measure the in-situ density or uses a nuclear source to measure and calculate the in-situ density of a field test site. Never before has any method provided the means for calculating in-situ density as efficiently as the present invention.

SUMMARY

It may now be seen from the above description that the present invention provides a method and apparatus for determining the in-situ density of porous materials. Once the resistivity of the material has been obtained, this value may be inserted into a geophysical-in-situ density equation to calculate the in-situ density. The geophysical in-situ density equations (equation 5 or 8) also uses a number of constants which may be derived in various ways. These constants include the resistivity of a pore filling fluid, the resistivity of the porous material when the porous material is at least partially saturated with the pore filling fluid, a formation factor of the porous material, in-situ density constants of the porous material, and the in situ moisture content of the porous material. Once these constants are determined for a given material, they may be repeatedly used in calculating in-situ density.

The present invention also provides a method for measuring the resistivity of the homogenous porous material with an electrode positioning device. The device is placed on the surface of the porous material and the resistivity is measured through electrodes which are located on the device and in contact with the surface. The electrode positioning device may then be rotated to a new position and the resistivity may be remeasured. This may be repeated several times. The difference in resistivity measurements at different rotated positions indicates the homogeneity of the porous material. In highly homogeneous material, the resistivity that is measured in the various rotated positions will vary less than a few percent. In earthen material that is less homogeneous the difference in the resistivity measurements will vary more than a few percent. The data obtained through the resistivity measurements may then be averaged to obtain an average resistivity value for a particular location. This process may be repeated in additional locations so that an average resistivity may be obtained for a given area of the porous material.

Once a first in-situ density value is calculated for a given location, additional values may be calculated after a period of time. The in-situ density values may then be compared to determine the change of the in-situ density over time.

A method of measuring the resistivity of the pore filling fluid is also disclosed which includes the step of mixing a sample of the porous material with the pore filling fluid. After colloidal particles are allowed to settle, the resistivity of the pore filling fluid is measured using the electrodes of the resistivity measuring device.

The present invention also includes a device for determining the in-situ density of a porous material. The device comprises a plurality of electrodes for conducting electrical current to and from the porous material. A resistivity meter is attached to the electrodes through an interfacing device, such as electrical wire. The device may also comprise an electrode positioning device for positioning electrodes in a predetermined spacial relationship.

Although the description above contains many specifications, these should not be construed as limiting the scope of the invention but as merely providing illustrations of some of presently preferred embodiments of this invention. For example, it is understood that various other equations may be used to calculate the variable and constants used in the present invention and still achieve the objects of the present invention. Furthermore, other measuring devices may be used to measure the variables and constants used in the present invention. Thus, the scope of the invention should be determined by the appended claims and their legal equivalents rather than by the examples given.

What is claimed is:

1. A geotechnical method of determining the in-situ void ratio density of a porous material under test (PMUT) by electrically probing said porous material's surface, comprising the steps of:

a) analyzing a standard sample of a material (SSM) with geotechnical characteristics similar to those of the PMUT, said SSM, after evaluation by independent methods, having known void ratio density "$D_v$", known void ratio range limits "$e_{max}$", the void ratio of the SSM in loosest state and "$e_{min}$", the void ratio of the SSM in densest state, known saturation levels "S" of its pore filling fluid with known permanent resistivity "$R_w$", known material resistivity "R", b) solving for SSM, equation system $$\Phi = \sqrt[m]{\frac{aR_W}{RS^n}},$$

and $$e = \frac{\Phi}{1-\Phi}$$

and $$D_v = \left(\frac{e_{max} - \frac{\Phi}{1-\Phi}}{e_{max} - e_{min}}\right) \times C_V$$

where an iterative approach makes four unknowns converge to final values for the formation factor "a", the water saturation variable "n", the cementation exponent "m", and constant "$C_v$", of the SSM;

c) measuring in-situ the resistivity "R" of the PMUT with an electrical probe;

d) measuring by independent means, the moisture saturation "S" for the PMUT;

e) solving, for PMUT, equation system $$\Phi = \sqrt[m]{\frac{aR_W}{RS^n}},$$

and $$e = \frac{\Phi}{1-\Phi}$$

and $$D_v = \left(\frac{e_{max} - \frac{\Phi}{1-\Phi}}{e_{max} - e_{min}}\right) \times C_V$$

where S and R are obtained in steps c) and d) and $R_w$, a, n, m, $C_v$, $e_{max}$, $e_{min}$ are those of SSM.

2. A method of claim 1, where the resistivity of step c) is obtained by averaging measurements over multiple locations.

3. A method of claim 1, where the evaluation of the SSM by independent methods comprises the application of the guidelines in ASTM D 1557-78 modified by using a non-conductive compaction mold with an installed Wenner array.

4. A method of claim 1, where the evaluation of the SSM by independent methods comprises the application of the guidelines in ASTM 698-78 modified by using a non-conductive compaction mold with an installed Wenner array.

5. A method of claim 1, where the evaluation of the SSM by independent methods comprises the application of the guidelines in ASTM D 2922-81.

6. A method of claim 1, where the evaluation of the SSM by independent methods comprises the application of the guidelines in ASTM D 1556.

7. A geotechnical method of determining the in-situ relative density of a porous material under test (PMUT) by electrically probing said porous material's surface, comprising the steps of:

a) analyzing a standard sample of a material (SSM) with geotechnical characteristics similar to those of the PMUT, said SSM, after evaluation by independent methods, having known relative density "$D_r$", known unit weight range limits "$\rho_{max}$" maximum laboratory unit weight and "$\rho_{min}$" minimum laboratory unit weight, known Specific gravity "$G_s$", known saturation levels "S" of its pore filling fluid with known permeant resistivity "$R_w$", known material resistivity "R", b) solving, for said SSM, equation system $$\Phi = \sqrt[m]{\frac{aR_W}{RS^n}}$$

and $$\rho_f = (1 - \Phi)G_s$$

and $$D_r = \left( \frac{(1-\Phi)G_s - \rho_{min}}{\rho_{max} - \rho_{min}} \right) \left( \frac{\rho_{max}}{(1-\Phi)G_s} \right) \times C_r$$

where an iterative approach makes four unknowns converge to final values for the formation factor "a", the water saturation variable "n", the cementation exponent "m", and constant "$C_r$", of the SSM;

c) measuring in-situ the resistivity "R" of the PMUT with an electrical probe;

d) measuring by independent means, the moisture saturation "S" for the PMUT;

e) solving, for PMUT, equation system $$\Phi = \sqrt[m]{\frac{aR_W}{RS^n}}$$

and

-continued $$\rho_f = (1 - \Phi)G_s$$

and $$D_r = \left( \frac{(1-\Phi)G_s - \rho_{min}}{\rho_{max} - \rho_{min}} \right) \left( \frac{\rho_{max}}{(1-\Phi)G_s} \right) \times C_r$$

where S and R are obtained in steps c) and d) and Rw, a, n, m, $C_r$, $\rho_{max}$, $\rho_{min}$ are those of SSM.

8. A method of claim 7, where the resistivity of step c) is obtained by averaging measurements over multiple locations.

9. A method of claim 7, where the evaluation of the SSM by independent methods comprises the application of the guidelines in ASTM D 1557-78 modified by using a non-conductive compaction mold with an installed Wenner array.

10. A method of claim 7, where the evaluation of the SSM by independent methods comprises the application of the guidelines in ASTM 698-78 modified by using a non-conductive compaction mold with an installed Wenner array.

11. A method of claim 7, where the evaluation of the SSM by independent methods comprises the application of the guidelines in ASTM D 2922-81.

12. A method of claim 7, where the evaluation of the SSM by independent methods comprises the application of the guidelines in ASTM D 1556.

* * * * *

UNITED STATES PATENT AND TRADEMARK OFFICE
CERTIFICATE OF CORRECTION

PATENT NO. : 5,861,751
DATED : 19 JANUARY 1999
INVENTOR(S) : Dennis M. Anderson and William J. Ehni It is certified that error appears in the above-identified patent and that said Letters Patent is hereby corrected as shown below:

Column 7, Lines 37 through 41

Delete the text paragraph in column 7, lines 37 through 41 inclusive. Remove from the patent the following text:

> The irreducible water saturation "$Sw_{irr}$" is either determined by lab testing or is set at a whole number between 1 and 10. The "$Sw_{irr}$" is the percent irreducible water saturation (the number is typically represented in percentage form. i.e., Y%)

Column 8, Line 65

In column 8 the bottom paragraph, last sentence incorrectly reads as follows:

> The following sequence of equations are used to derive the relative in-situ density of porous material using the relationships of void ratios (Bowles, J.E. 1992):

Please replace the word "relative" which appears in column 8, line 65, in the sentence above with the two words "void ratio" to correctly read as follows.

> The following sequence of equations are used to derive the void ratio in-situ density of porous material using the relationships of void ratios (Bowles, J.E. 1992):

UNITED STATES PATENT AND TRADEMARK OFFICE
CERTIFICATE OF CORRECTION

PATENT NO. : 5,861,751
DATED : 19 JANUARY 1999
INVENTOR(S) : Dennis M. Anderson and William J. Ehni It is certified that error appears in the above-identified patent and that said Letters Patent is hereby corrected as shown below:

Column 9, Equations 4

In column 9 at the very top, equations number 4 is presented as follows:

$$D_r = \left( \frac{e_{max} - e}{e_{max} - e_{min}} \right) \quad \text{(equation 4)}$$

Please replace the "Dr" in the equations with "Dv", the correct equation number 4 is presented below:

$$D_v = \left( \frac{e_{max} - e}{e_{max} - e_{min}} \right) \quad \text{(equation 4)}$$

UNITED STATES PATENT AND TRADEMARK OFFICE
CERTIFICATE OF CORRECTION

PATENT NO. : 5,861,751
DATED : 19 JANUARY 1999
INVENTOR(S) : Dennis M. Anderson and William J. Ehni It is certified that error appears in the above-identified patent and that said Letters Patent is hereby corrected as shown below:

Column 9, Line 6

In column 9 the top of the paragraph, line 6, the text reads as follows :

$D_r$ = Relative Density of in-situ porous material

Please replace the "Dr" in this statement with the letters "Dv", and replace the word "Relative" with the words "Void Ratio", such that column 9 line 6 reads as follows:

$D_v$ = Void Ratio Density of in-situ porous material

Column 9, Line 33

Delete the number "2" and replace the number with numbers "3". Column 9, Line 33 should read as follows:

equation 1 and 3

UNITED STATES PATENT AND TRADEMARK OFFICE
CERTIFICATE OF CORRECTION

PATENT NO. : 5,861,751
DATED : 19 JANUARY 1999
INVENTOR(S) : Dennis M. Anderson and William J. Ehni It is certified that error appears in the above-identified patent and that said Letters Patent is hereby corrected as shown below:

Column 9, Equation 7

In column 9 approximately two third down from the top equations number 7 is presented as follows:

$$D_r = \left( \frac{e_{max} - \frac{\Phi}{1 - \Phi}}{e_{max} - e_{min}} \right) \times C_V \qquad (equation\ 7)$$

Please replace the "Dr" in the equations with "Dv", the correct equation number 7 is presented below:

$$D_v = \left( \frac{e_{max} - \frac{\Phi}{1 - \Phi}}{e_{max} - e_{min}} \right) \times C_V \qquad (equation\ 7)$$

Column 9, Line 55

Delete the text and the brackets ( ) in column 9, within line 55. Remove from the patent the following text and brackets:

(they require specificity gravity $G_s$ of the soil)

UNITED STATES PATENT AND TRADEMARK OFFICE
CERTIFICATE OF CORRECTION

PATENT NO. : 5,861,751
DATED : 19 JANUARY 1999
INVENTOR(S) : Dennis M. Anderson and William J. Ehni It is certified that error appears in the above-identified patent and that said Letters Patent is hereby corrected as shown below:

Column 10, Line 30

Delete the number "5" and the number "8" and replace these numbers with numbers "7" and number "11". Column 10, Line 30 should read as follows:

1996 synthesis, as identified above as equation 7 or 11.

Column 10, Line 34

Delete the number "5" and the number "8" and replace these numbers with numbers "7" and number "11". Column 10, Line 34 should read as follows:

in-situ density equation (equation 7 or 11) a user may

Column 10, Line 54

Delete the number "5" and the number "8" and replace these numbers with numbers "7" and number "11". Column 10, Line 54 should read as follows:

equations (equation 7 or 11) also uses a number of constants

UNITED STATES PATENT AND TRADEMARK OFFICE
CERTIFICATE OF CORRECTION

PATENT NO. : 5,861,751
DATED : 19 JANUARY 1999
INVENTOR(S) : Dennis M. Anderson and William J. Ehni It is certified that error appears in the above-identified patent and that said Letters Patent is hereby corrected as shown below:

Column 12, Line 16

In column 12, line 16, reads as follows:

constant "$C_{vv}$", of the SSM;

Please replace the "Cvv" in this statement with the letters "Cv", such that column 12, line 16, reads as follows:

constant "$C_v$", of the SSM;

Signed and Sealed this

Twenty-sixth Day of September, 2000

Attest:

Q. TODD DICKINSON

*Attesting Officer*         *Director of Patents and Trademarks*